(12) United States Patent
Guzik (10) Patent No.: US 11,689,654 B2
(45) Date of Patent: Jun. 27, 2023

(54) DATA EXCHANGE DURING A VOICE CALL SESSION

(71) Applicant: Thomas Guzik, Edina, MN (US)

(72) Inventor: Thomas Guzik, Edina, MN (US)

( * ) Notice: Subject to any disclaimer, the term of this patent is extended or adjusted under 35 U.S.C. 154(b) by 0 days.

(21) Appl. No.: 17/352,150

(22) Filed: Jun. 18, 2021

(65) Prior Publication Data

US 2022/0407957 A1   Dec. 22, 2022

(51) Int. Cl.
| | |
|---|---|
| *H04M 1/72469* | (2021.01) |
| *H04W 4/08* | (2009.01) |
| *H04W 4/16* | (2009.01) |
| *G06Q 30/016* | (2023.01) |
| *H04M 3/22* | (2006.01) |
| *G06Q 20/32* | (2012.01) |
| *H04W 8/22* | (2009.01) |

(52) U.S. Cl.
CPC ...... *H04M 1/72469* (2021.01); *G06Q 20/322* (2013.01); *G06Q 20/325* (2013.01); *G06Q 30/016* (2013.01); *H04M 3/2218* (2013.01); *H04W 4/08* (2013.01); *H04W 4/16* (2013.01); *H04W 8/22* (2013.01)

(58) Field of Classification Search
CPC .. G06Q 20/322; G06Q 20/325; G06Q 30/016; H04W 4/08; H04W 4/16; H04W 8/22

USPC ............................................... 455/416
See application file for complete search history.

(56) References Cited

U.S. PATENT DOCUMENTS

| | | | |
|---|---|---|---|
| 9,602,986 B2 | 3/2017 | Vendrow et al. | |
| 9,648,469 B2 | 5/2017 | Gilson | |
| 2016/0104145 A1* | 4/2016 | Critchley | G06Q 20/36 705/41 |
| 2017/0243013 A1* | 8/2017 | Herlocher | G06F 21/606 |
| 2020/0162519 A1* | 5/2020 | Hilling | H04L 65/1104 |

* cited by examiner

*Primary Examiner* — Maria El-Zoobi
(74) *Attorney, Agent, or Firm* — Han Santos, PLLC (57) ABSTRACT

Techniques for performing data exchanges during voice call sessions is described. In one example, a network server may facilitate a voice call session between user devices and associate a unique session number (USN) to each of the voice call sessions. The USN may be used as a reference when toggling between voice call sessions. In one example, when a particular voice call session is toggled to an active state, the network server may limit recipients of sensitive financial information to be between transacting parties in the active voice call session. By isolating other user devices that are not privy to transactions in the active voice call session, the chances for a transacting party in the active voice call session to accidentally send payments, for example, to an unintended recipient can be substantially minimized.

20 Claims, 8 Drawing Sheets

DATA EXCHANGE DURING A VOICE CALL SESSION

BACKGROUND

Due to the ubiquity of cellular phones, usage patterns have emerged to support commerce and payments. Typically, orders may be placed via a smart application or a website. Where payment methods are sited on a separate smart application or the website, there is platform support, such as in the operating system, that enables applications and websites to switch back and forth with a payment method.

However, there are still many reasons for users to place orders via a conversation with a customer service representative. In some cases, the subject matter of purchase is expensive, complex, or high risk. In other cases, the vendor may be a small business without the means to take e-commerce orders. In yet other cases, customers may simply prefer to place orders via conversation.

Presently, when placing purchases during a conversation over a voice call, payment may involve providing private or otherwise sensitive data by reciting user identification information, credit card information, and other information needed by the customer service representative to complete an order. This method is not secure. Other parties may overhear the private or sensitive information. Furthermore, the customer service representative may gain access to the private or sensitive information and can have occasion to steal this data or at least place the vendor under suspicion. In other situations, the vendor may simply lose business to parties not wishing to transfer private and sensitive information out loud.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

This disclosure is directed to techniques for performing data exchanges during voice call sessions between transacting parties. A voice call session may include a communicative connection between two or more user devices via a cellular communication platform, an Internet platform, or a combination thereof. The user device may include a mobile device, laptop, personal digital assistant (PDA), multimedia device, or any other similar functioning device. The data exchange may include sending and/or receiving payments or other information that relates to fulfillment of a contract between the transacting parties.

In one example, a network server may facilitate the establishment of a voice call session between two user devices. The network server may further associate a particular unique session number (USN) to the established voice call session. The USN may include an identification (ID) number that a network server can generate and associate with the established voice call session to form a key-value pair between the USN and the voice call session. In this example, a user device may use the USN as a reference when selecting one voice call session to be in an active state while the rest of the non-selected voice call sessions are in a standby state. When a particular voice call session is toggled to an active state, the network server may limit recipients of sensitive financial information (e.g., preferred type of payments, bank information) between the transacting parties in the active voice call session. By isolating other user devices that are not privy to transactions of the transacting parties in the active voice call session, the chances of accidental error in payments, for example, to an unintended recipient can be substantially minimized. Further, the network server may use each of the associated USNs as an identifier for collected and recorded activities between the transacting parties during the duration of the corresponding voice call session. The collected and recorded activities may include additional sub-identifiers to look up information similar to a relational database.

In some embodiments, the network server may include a data exchange platform that manages the data exchanges between the user devices during the voice call sessions. In one example, the data exchange platform may facilitate the establishment of voice call sessions between the user devices. The data exchange platform may also determine a particular voice call session and associated transacting parties based upon user-entered confirmation of the particular voice call session and associated transacting parties from at least one of the transacting parties. Based on the received user-entered confirmation, the data exchange platform may then associate a USN to the voice call session to indicate that it is distinct from other concurrent voice call sessions that may involve the at least one transacting party in the current voice call session.

For example, a first user device that is associated with a first party is communicatively connected with a second user device and a third user device that are associated with a second party and a third party, respectively. In this example, the data exchange platform may determine whether the three-way call between the first, second, and third user devices involves the same transaction by prompting at least one user device to display an interface menu, which enables the user of the at least one user device to confirm the voice call session and number or identities of the transacting parties in the voice call session. Following a determination by the data exchange platform that the three-way call may involve the same transaction (voice call session), the data exchange platform can associate a particular USN to the voice call session to form a key-value pair. Multiple key-value pairs may be displayed on the interface menu to enable a user to toggle between voice call sessions.

In one embodiment, the data exchange platform may prompt the user device to display the interface menu that can enable a user to toggle between voice call sessions using the associated USNs. In this example, the users need not hang up the call to enter and make sure that the recipient of the sensitive financial or payment information is the desired party or intended user device. The data exchange platform, via the interface menu, may preconfigure and display only the desired recipients of the sensitive financial information based upon the particular voice call session that is toggled in the active state. For example, the data exchange platform may only display the identities, preferred type and mode of payments, pending data exchange requests, etc. of the associated transacting parties to the voice call session that is in an active state.

The data exchange platform may also use a preconfigured time period threshold that limits a time between sending of a request for a voice call session and an acceptance by the called party. Following an expiration of the time period threshold and without an acceptance of the request from the called user device, the data exchange platform may connect the calling user device to the called user device and prompt the calling user device to display the interface menu to initiate a transaction with the called user device. The interface menu may be displayed on a user interface (UI) of the calling user device even though the calling user device may be directed to a voicemail inbox (or register) of the called user device. In this regard, the calling user device may still send secure financial information that can be displayed as a voicemail text pending acceptance of the called user device.

Details regarding the novel techniques reference above, presented herein, are described in detail, below, with respect to several figures that identify elements and operations used in systems, devices, methods, and computer-readable storage media that implement the techniques.

Example Network Environment

Figure 1:
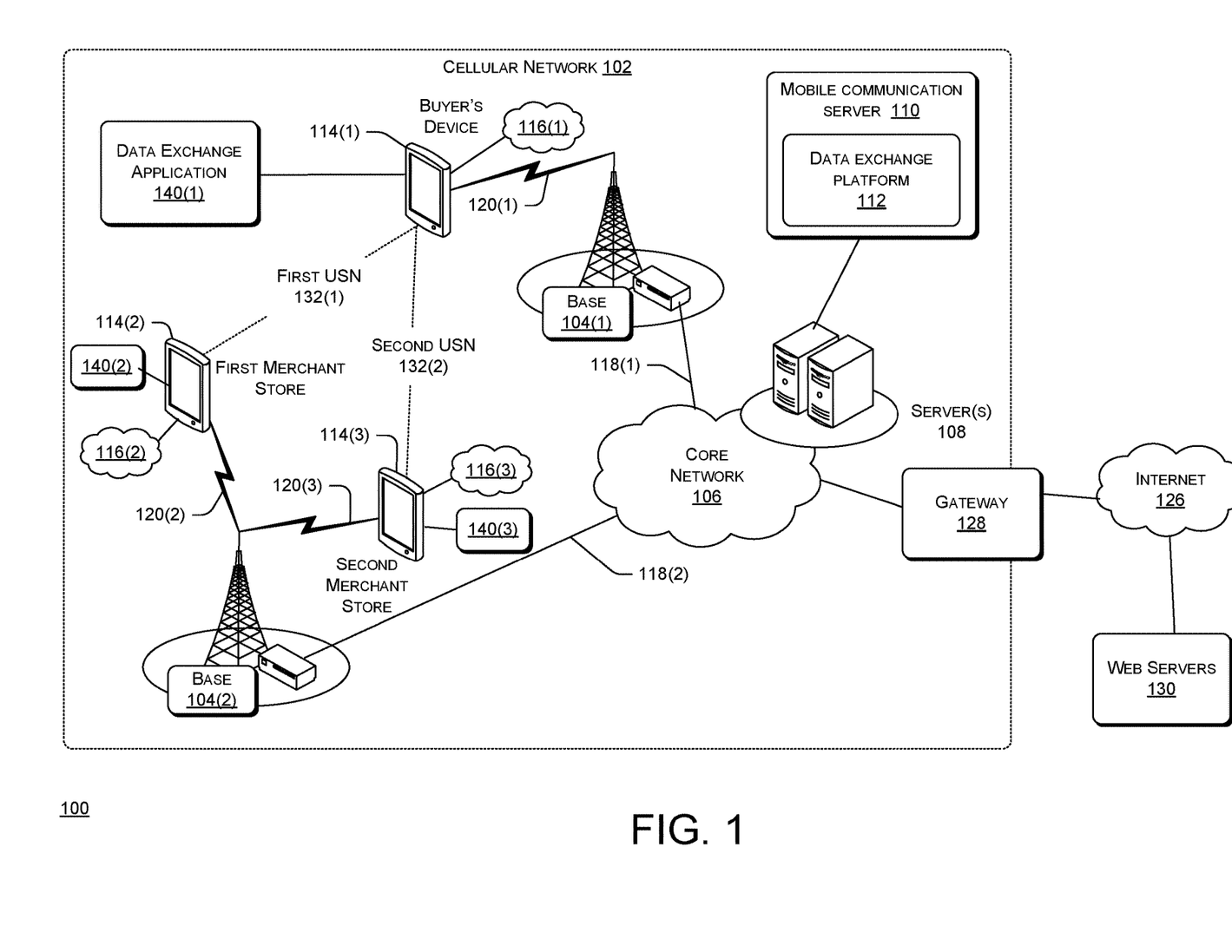
FIG. 1 is an example diagram of a cellular network environment in which data exchanges during voice call sessions may be implemented.

FIG. 1 is a diagram of an example cellular network environment 100 in which the data exchanges during voice call sessions may be implemented. In one embodiment, a network server may include a data exchange platform that implements the data exchanges during the voice call sessions. The data exchange platform may include a program that associates different USNs to different voice call sessions to form key-value pairs. The data exchange platform may further prompt each of the communicatively connected user devices to display an interface menu that enables the parties to perform data exchanges or communications in parallel with the voice call sessions. For example, the interface menu may allow a user to confirm a number and identities of transacting parties to the voice call session, toggle between voice call sessions, send payment, perform electronic signature, place additional conditions to a transaction, and/or the like. Upon completion of the transaction(s), the data exchange platform may send notifications of the completed transaction(s) to each of the communicatively connected user devices. As described herein, the communicative connection may be established upon acceptance of a request for a voice call session by a recipient user device, a chatbot conversation between a calling user device and a called user device, or when the calling user device is directed to a voicemail inbox to which a voicemail text or message can be shown on the called user device.

As shown, the cellular network environment 100 may include a cellular network 102 that is provided by a wireless telecommunication carrier. It is noted that, although the present discussion refers to a cellular network, other network architectures may be used in place of the cellular network shown and described with respect to FIG. 1. The cellular network 102 includes, for example, cellular network base stations 104(1)-104(2) and a core network 106. The core network 106 may further include one or more servers 108 such as a mobile communication server 110, which may include a data exchange platform 112. The data exchange platform 112 may manage, for example, concurrent data exchanges and voice call sessions between user devices 114(1)-114(3).

Each of the user devices 114(1)-114(3) may be capable of connecting to a network, including the Internet, via a wireless network connection other than the carrier network wireless services. As shown, the user device 114(1) includes a connection to a network 116(1), user device 114(2) includes a connection to a network 116(2), and the user device 114(3) includes a connection to a network 116(3). The wireless connections are made by way of any method known in the art, such as Bluetooth®, Wi-Fi™, Mesh, or other wireless connections, or by way of wired connections. Further, the user devices 114(1)-114(3) may be communicatively connected with each other via cellular data, use of Internet Packet (IP), or a combination thereof.

Each one of the base stations 104(1)-104(2) may serve as a hub of the local wireless network and/or a gateway between a wired network and a wireless network. The base stations 104(1)-104(2) are responsible for handling data traffic between the user devices 114(1)-114(3) that are associated with different transacting parties such as a buyer for the user device 114(1), a first merchant store for the user device 114(2), and a second merchant store for the user device 114(3). Further, the base stations 104(1)-104(2) are responsible for establishing wireless communications between the user devices 114(1)-114(3) and the data exchange platform 112 in the example shown. Each of the base stations 104(1)-104(2) may be communicatively connected to the core network 106 via a corresponding backhaul 118(1)-118(2). Each of the backhauls 118(1)-118(2) may be implemented using copper cables, fiber optic cables, microwave radio transceivers, and/or the like. Accordingly, each one of the user devices 114(1)-114(3) may connect to the data exchange platform 112 via cellular signals 120 of the base station 104 and the core network 106. The core network 106 may provide telecommunication and data communication in accordance with one or more technical standards, such as Enhanced Data Rates for GSM Evolution (EDGE), Wideband Code Division Multiple Access (W-CDMA), HSPA, LTE, LTE-Advanced, CDMA-2000 (Code Division Multiple Access 2000), 5G and/or so forth.

Each of the user devices 114 may include an electronic communication device such as a cellular phone, a smartphone, a session initiation protocol (SIP) phone, a laptop, a PDA, a satellite radio, a global positioning system (GPS), IoT devices with a tracking mechanism, a multimedia device, a video device, a camera, a game console, a tablet, a smart device, a wearable device, or any other similar functioning device. Further, each of the user devices 114 may be capable of connecting to an Internet 126 via a gateway 128. Additionally, apart from the cellular network 102, the cellular network environment 100 includes multiple web servers 130 that may be accessed through the Internet 126.

In an example embodiment, the data exchange platform 112 may be configured to manage voice call sessions and data exchanges during the voice call sessions between the user devices 114(1)-114(3). Managing data exchanges may include identifying each group (or voice call session) using different USNs, configuring financial information such as preferred types and mode of payments by the user devices in each group, and managing the financial information to be displayed during the toggling of the voice call sessions. The configuring of financial information may include, for example, setting up recipient financial institutions associated with the user devices in each of the voice call sessions and displaying only the recipient financial institutions of the associated transacting parties in the toggled voice call session that is in active state.

In one example, the data exchange platform 112 may associate or pair a USN 132 such as a first USN 132(1) to a first voice call session between the user device 114(1) and 114(2), and a second USN 132(2) to a second voice call session between the user device 114(1) and 114(3). The first voice call session may be differentiated from the second voice call session via a distinct associated USN. In this example, the user device 114(1) may use the USN to select a voice call session to be placed in an active state and in a standby state. When a voice call session such as the first voice call session that is associated with the first USN 132(1) is placed in the active state, the data exchange platform 112 may facilitate the displaying of the payment information on the user devices 114(1) and 114(2) only. Since the user device 114(3) is not privy to the transaction between the user devices 114(1) and 114(2), then the payment information of the user device 114(3) may not be displayed so as to avoid unintended payments to the user device 114(3) during the first voice call session.

The USN 132 may include an ID number that can be paired with a voice call session to form a distinct key-value pair. By separating each of the voice call sessions with the USN 132, the data exchange platform 112 may use the USN 132 as a main label or identifier to stored one or more activities between transacting parties during each of the voice call sessions. Since the USN 132 may only provide the main label, then the one or more activities may further include additional identifiers or references when stored in a database. In one example, a user of the user device 114(1) may toggle between the voice call sessions without having to manually input the recipient of sensitive data information. The data exchange platform 112 may retrieve the sensitive data information such as credit card numbers, preferred mode or type of payments by each user device from a database (not shown), etc., and display the retrieved sensitive data information via the interface menu on the user devices. The sensitive financial information in each user device is collected and stored during initial sign-up by the subscribers.

In an implementation, the data exchange platform 112 may initially receive a request for a voice call session from the user device 114(1), which is associated with the buyer. The data exchange platform 112 may then send the request to the recipient user device 114(2), which is associated with a merchant store. Following an acceptance of the request by the user device 114(2), the data exchange platform 112 associates the first USN 132(1) that includes a unique ID number for the voice call session between the first user device 114(1) and the second user device 114(2).

Following the associating of the USN 132(1), the data exchange platform 112 may facilitate the voice call session between the first user device 114(1) and the second user device 114(2). The data exchange platform 112 may also cause the display of the interface menu (not shown) at each of the first user device 114(1) and the second user device 114(2). The interface menu may enable the buyer and store merchant to request data exchanges such as to request viewing and accessing details of their current transaction(s). The details and information that can be accessed or entered via the interface menu may include elements of a legal contract such as identification of the object of the transaction, consent such as an electronic signature, and/or other information such as amount or payment of consideration.

In one example, the voice call session may utilize a first communication platform while the data exchange transfer may use a second communication platform. The first communication platform may include Voice over Internet Protocol (VoIP) or cellular communication while the second communication platform can be a text messaging platform, a social network platform, an exchange platform, or an email platform. Following the completion of the transaction, the data exchange platform 112 may send notifications to user devices. The notifications, for example, may include receipts, objects of the contract, considerations, payment of considerations, additional notes that bind the parties to the agreement, and/or similar information.

Alternatively, or additionally, each of the user devices 114(1)-114(3) may include a data exchange application 140 that can implement the data exchanges at the user device side. The data exchange application 140 may include a program that is installed in the user device to facilitate peer-to-peer data exchanges similar to data exchanges described above. For example, the first user device 114(1) may dial the number of the second user device 114(2) to buy some goods from the store merchant associated with the second user device 114(2). In this example, the data exchange during the voice call session may be implemented by the second user device 114(2) through the data exchange application 140(2).

Example Sequence Diagram of Data Exchange During Voice Call Session

Figure 2:
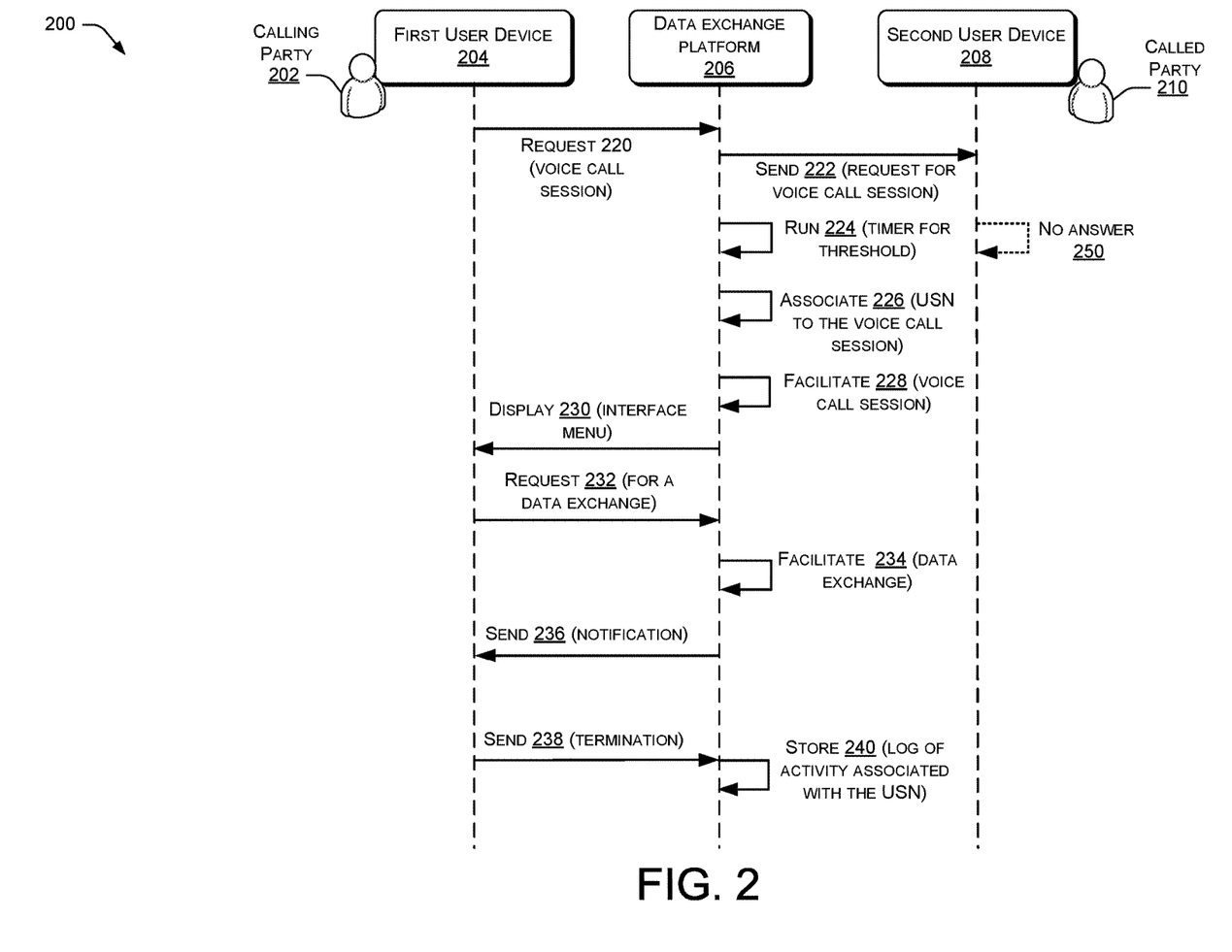
FIG. 2 is an example sequence diagram that includes the data exchange between user devices during a particular voice call session.

FIG. 2 is an example sequence diagram 200 that includes the data exchange between the user devices during a voice call session. The sequence diagram 200 illustrates a calling party 202 associated with a first user device 204, a data exchange platform 206 of the network server, and a second user device 208 that is associated with a called party 210. The first user device 204, data exchange platform 206, and the second user device 208 correspond to user device 114(1), data exchange platform 112, and the user device 114(2), respectively, of FIG. 1.

As shown, the calling party 202 may dial the second user device 208, and the first user device 204 requests 220 for a voice call session. The data exchange platform 206 receives the request and sends 222 the request for the voice call session to the second user device 208. The sending of the request may trigger a visual alert, an audio alert, or a vibrating alert in the second user device 208. Concurrent with the sending of the request, the data exchange platform 206 may trigger or run 224 a timer for the time period threshold. The time period threshold may include a preconfigured threshold value that is counted from the time of sending the request to the recipient party. The time period threshold may be applied for each request for a voice call session.

In response to an acceptance of the request by the called party 210 within the time period threshold, the data exchange platform 206 may associate 226 a USN such as the first USN 132(1) of FIG. 1 to the voice call session, which includes the communicative connection between the first user device 204 and the second device 208. In one embodiment, the associated or assigned USN may be used by the first user device 204 and/or the second device 208 when toggling between voice call sessions. Further, the associated USN may be used as the main identifier to storage locations of recorded activities between the first user device 204 and the second user device 208 during the voice call session. Each of the recorded activities may further include additional tags or sub-identifiers for tracking purposes.

The activities may include sending of payment, amendment, and/or acceptance of agreement that was translated into writing, entering of additional notes such as condition(s) of the agreement or contract, and/or the like. Generally, these activities are documentary evidence of the verbal communications during the voice call sessions. For example, electronic signatures may be used to document confirmation of verbal agreements during the voice call sessions.

Following the association of the USN, the data exchange platform 206 may then facilitate 228 the voice call session between the first user device 204 and the second user device 208. For example, the first user device 204 is communicatively connected to the second user device 208 via a cellular communication channel. With the established communicative connection between the first user device 204 and the second user device 208, the data exchange platform 206 may prompt the first user device 204 to display 230 an interface menu such as an interface menu 600 of FIG. 6.

In one example, the interface menu may display options to enable the calling party 202 to request 232 a data transfer or exchange. The interface menu may also display other information such as preferred type and mode of payments that are accepted by the user devices. Further, the interface menu may be used to confirm the number, identities, and/or other information of the transacting parties in each of the voice call sessions. In addition, the interface menu may be used to toggle between voice call sessions where the data exchange platform 206 can correspondingly adjust the payment information to be displayed at each toggling. For example, the data exchange platform 206 may cause the displaying of the financial information of the first user device 204 and the second user device 208 on the interface menu during the voice call session in the illustrated example. In this example, financial information associated with one or more non-privy user devices may not be displayed on the interface menu.

Following the receiving of the request 232, the data exchange platform 206 may then facilitate 234 the data exchange between the first user device 204 and the second user device 208. Upon completion of the data transfer, the data exchange platform 206 sends 236 a notification of the completion of the data transfer to the requesting first user device 204. The calling party 202 may then terminate the voice call session, and the first user device 204 sends 238 the request to terminate the voice call session to the data exchange platform 206. In one example, the data exchange platform 206 may end the voice call session and store 240 a log of the one or more activities associated with the terminated voice call session.

In some embodiments, given a situation where no answer 250 is received from the second user device 208 within the time period threshold, then the data exchange platform 206 may still associate 226 the USN to a connection between the first user device 204 and the second user device 208 even though no communicative connection between the first user device 204 and the second user device 208 is established, for example, to direct the first user device 204 to the voicemail register of the second user device 208. Following the assigning of the USN, the data exchange platform 206 may prompt the first user device 204 to display 230 the interface menu that enables the calling party 202 to enter into a transaction pending acceptance by the called party 210. The called party 210 may receive a visual voicemail text or message and use the interface menu to reply or accept the transaction in the received visual voicemail text or message. In some instances, and upon expiration of the time period threshold, a chatbot may communicate with the calling party 202. In this case, the calling party 202 may utilize the interface menu to request 232 the data exchange as described above.

In one embodiment, different time period thresholds may be preconfigured for different requests for voice calls. For example, the first time period threshold for an initial caller may be longer than the second time period threshold for a second caller. In this example, the second caller may be directed immediately to a voicemail registry at the expiration of the shorter time period threshold.

Example Concurrent Voice Call Sessions and Collecting/Storing of Activities

Figure 3:
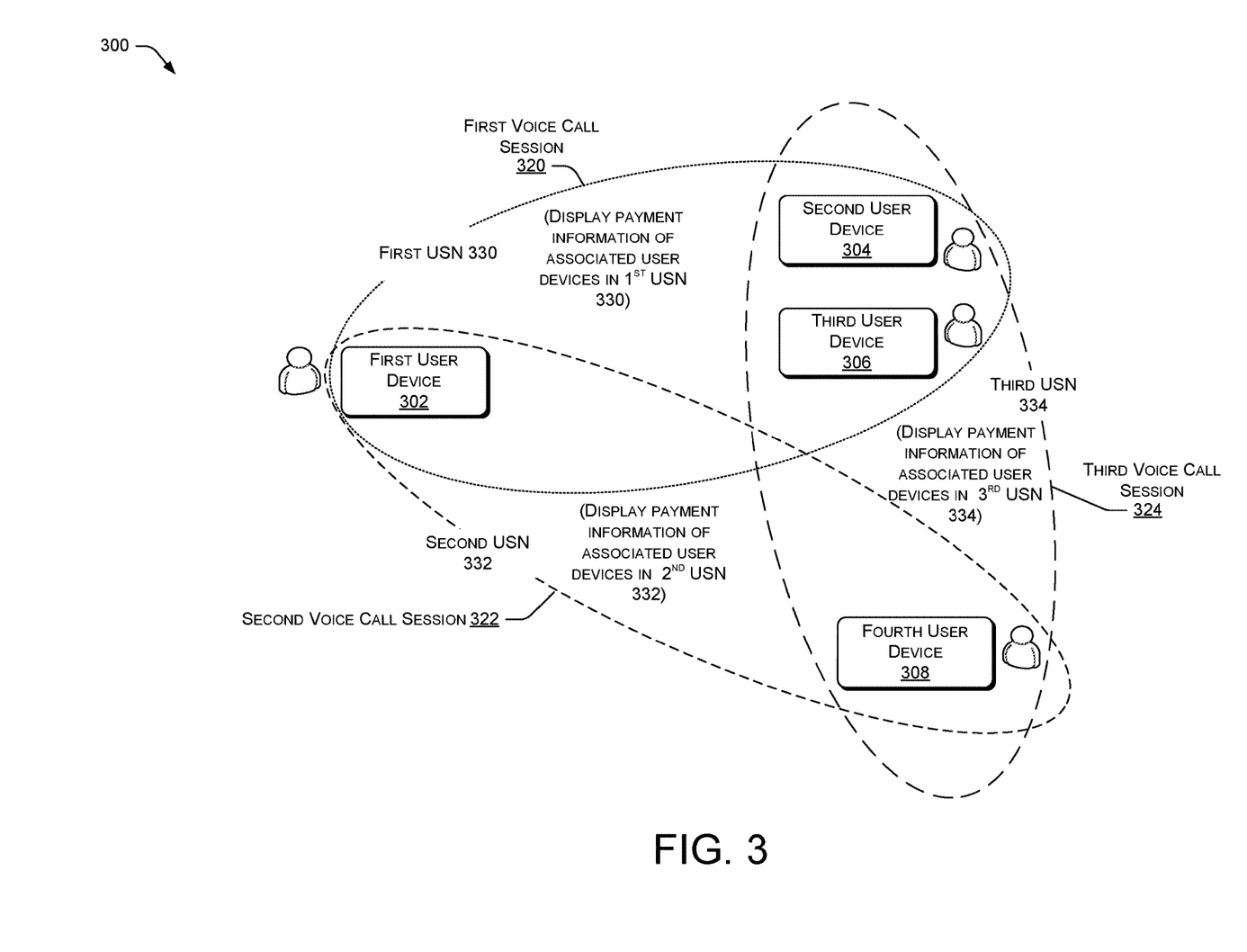
FIG. 3 is an example diagram of implementing multiple voice call sessions between user devices.

FIG. 3 is an example diagram 300 of implementing multiple voice call sessions between user devices. In one example, each of the multiple voice call sessions may be associated with a particular USN such that a toggling of the USNs may correspondingly change the paired voice call sessions and associated transacting parties. The toggling of the USNs may place a particular USN (or key-value pair) in active mode while the rest of the USNs are in standby mode to make sure that only the associated transacting parties in the corresponding active state-voice call session may perform the data exchange.

Diagram 300 includes a first user device 302, a second user device 304, a third user device 306, and a fourth user device 308. Further, the diagram illustrates a first voice call session 320, a second voice call session 322, and a third voice call session 326. The first voice call session 320 is associated with a first USN 330 and includes communicative connections between the first user device 302, second user device 304, and the third user device 306. The second voice call session 322 is associated with a second USN 332 and includes a communicative connection between the first user device 302 and the fourth user device 308. The third voice call session 324 is associated with a third USN 334 and includes communicative connections between the second user device 304, third user device 306, and the fourth user device 308. The user devices and associated transacting parties in each of the voice call sessions as shown may be identified based upon user-entered confirmation from at least one of the participating user devices. For example, the first user device 302 may use the interface menu to confirm the first voice call session 320 to include the first user device 302, second user device 304, and the third user device 306. The first user device 302 may also confirm the second voice call session 322 and the participating user devices to be in a separate voice call session, and so on.

In one example, a voice call session such as the first voice call session 320 may be toggled to an active state while the other two voice call sessions associated with the second USN 332 and the third USN 334 can be in a standby state. In this example, the interface menu may display the user profiles, preferred type of payments, and/or the like, of the first user device 302, second user device 304, and the third user device 306 in the first voice call session 320. In this example, still, the associated first USN 330 may be used as an identifier to storage locations of data exchanges between these transacting parties during the first voice call session

320. The data exchanges may further include sub-identifiers or additional tags for further identifications.

As shown, the first USN 330 is associated with a three-way conference call (or first voice call session 320) between the first user device 302, the second user device 304, and the third user device 306. Given a situation where the first user device 302 receives a new request for a voice call session from the fourth user device 308, then a separate second USN 332 may be associated with the voice call session between the first user device 302 and the fourth user device 308. The second USN 332 may be used to separately identify the transactions between first user device 302 and the fourth user device 308 from the transactions between the first user device 302, second user device 304, and the third user device 306 under the first USN 330. Note that either the first USN 330 or second USN 332 may be toggled to be in an active state while the other is in a standby state. When the second USN 332 is toggled to the active state, the interface menu may display the user profiles, preferred type of payments, and/or the like, of the first user device 302 and the fourth user device 308.

In one example, following the association of the first USN 330 to the three-way conference call (first voice call session 320), the network server may preconfigure the payment information such as the name of financial institutions, type, and mode of payments preferred by each of the first user device 302, second user device 304, and the third user device 306. The preconfigured payment information may be visible only to transacting parties under the first USN 330 to avoid error(s) in payment to non-transacting parties such as, for example, the fourth user device 308 that is not privy to the three-way conference call under the first voice call session 320.

Similarly, following the association of the second USN 332 for the second voice call session 322, the network server may preconfigure the payment information such as the name of financial institutions, type, and mode of payments preferred by the fourth user device 308. The payment information for the first user device 302 has been preconfigured earlier for the associated first USN 330. The preconfigured payment information between the first user device 302 and the fourth user device 308 under the second USN 332 may be implemented to avoid error(s) in payment to non-transacting parties such as, for example, in a case where the payment is made to the second user device 304 and/or the third user device 306 that is not privy to the one or more transactions under the second voice call session 322. Further, the network server may use the second USN 332 as a reference to identify storage locations for the recorded one or more transactions between the first user device 302 and the fourth user device 308 during the second voice call session 322. In one embodiment, the network server may allow each of the first-fourth user devices to use the interface menu to toggle between the voice call sessions.

In one example, the fourth user device 308 may also be involved in a separate three-way conference call with the second user device 304, and the third user device 306. In this example, the network server, via the interface menu, may enable the user of the fourth user device 308 to toggle between its voice call sessions, and the network server may correspondingly adjust the participating or recipient user device(s) depending upon which voice call session is currently and actively displayed on the interface menu.

Example Network Device

Figure 4:
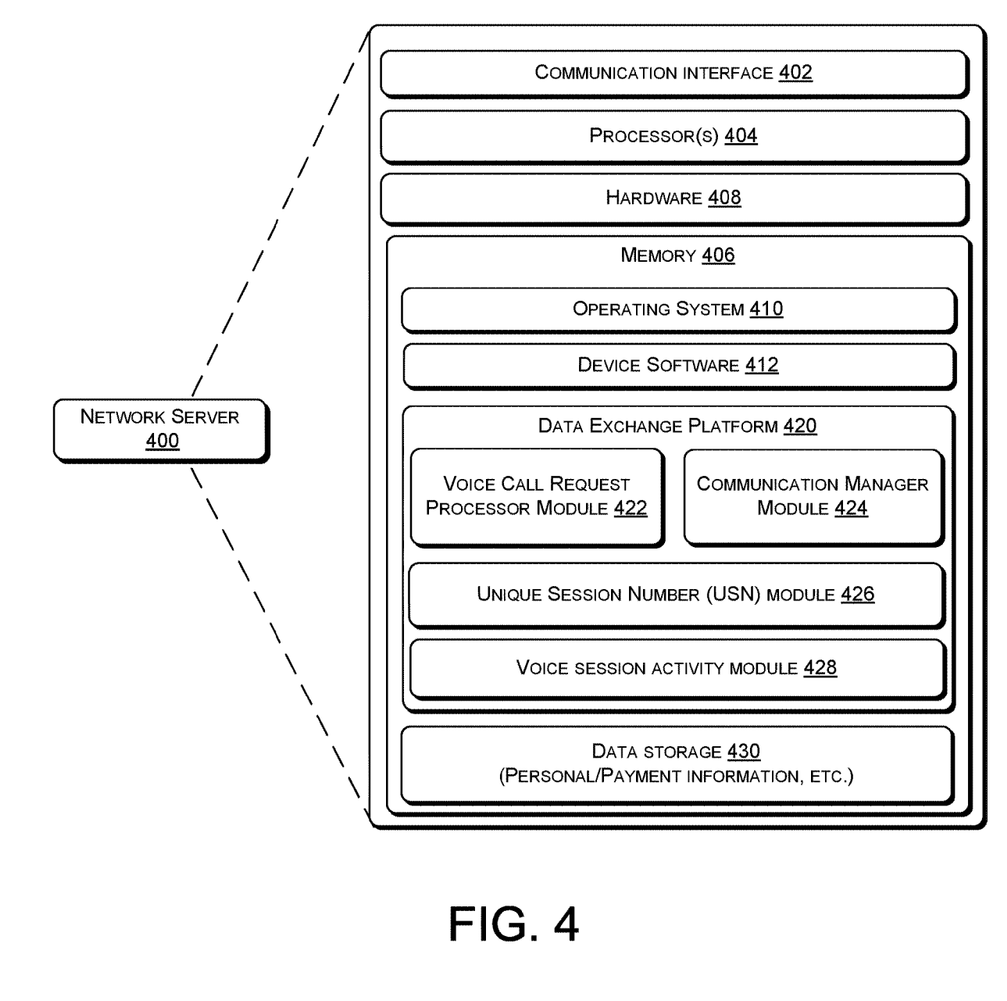
FIG. 4 is an example block diagram of a network server that facilitates the data exchanges between the user devices during the voice call sessions.

FIG. 4 is a block diagram showing various components of a network server 400 that facilitates data exchange during the voice call sessions between the user devices. The network server 400 may correspond to the mobile communication server 110 of FIG. 1.

The network server 400 may include a communication interface 402, one or more processors 404, memory 406, and device hardware 408. The communication interface 402 may include wireless and/or wired communication components that enable the network server 400 to transmit or receive voice and/or data communication via the wireless carrier network, as well as other telecommunication and/or data communication networks. In one example, the communication interface 402 may facilitate a voice call session via a first communication platform such as a cellular communication platform and perform data transfers via a second communication platform such as a text messaging platform, a social network platform, an exchange platform, or an email platform.

The memory 406 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 408 may include a modem that enables the network server 400 to perform data communication with the wireless carrier network. The device hardware 408 may further include signal converters (e.g., a digital-to-analog converter, an analog-to-digital converter), antennas, hardware decoders, and encoders, graphics processors, a universal integrated circuit card (UICC) or an embedded UICC (eUICC), and/or the like, that enable the network server 400 to execute applications and provide data communication functions.

The one or more processors 404 and the memory 406 may implement an operating system 410, device software 412, and a data exchange platform 420 that corresponds to the data exchange platform 112 of FIG. 1. Such software may include routines, program instructions, objects, and/or data structures that are executed by the processors 404 to perform particular tasks or implement particular abstract data types. The one or more processors 404 in conjunction with the data exchange platform 420 may further operate and utilize a voice call request processor module 422, a communication manager module 424, a USN module 426, a voice session activity module 428, and a data storage 430.

The operating system 410 may include components that enable the network server to receive and transmit data via various interfaces (e.g., user controls, communication interface 402, and/or memory input/output devices). The operating system 410 may also process data using the one or more processors 404 to generate outputs based on inputs that are received via a user interface. For example, the operating system 410 may provide an execution environment for the execution of the data exchange platform 420. The operating system 410 may include a presentation component that presents the output (e.g., displays the data on an electronic display, stores the data in memory, transmits the data to another electronic device, etc.).

The operating system 410 may include an interface layer that enables the data exchange platform 420 to interface with the modem and/or the communication interface 402. The interface layer may comprise public APIs, private APIs, or a combination of both public APIs and private APIs. Additionally, the operating system 410 may include other components that perform various other functions generally associated with an operating system. The device software 412 may include software components that enable the network server to perform functions. For example, the device software 412 may include a basic input/output system (BIOS), bootrom, or a bootloader that boots up the network server 400 and executes the operating system 410 following power-up of the network device.

The data exchange platform 420, when executed, manages the data exchanges between the user devices during the voice call sessions as described herein. The data exchange platform 420 may be a single block of executable instructions or it may be made up of several components. The components included in at least one implementation are described below. However, it is noted that in other implementations, more or fewer components may be configured and that one or more operations attributed to a particular component in the following description may be implemented in one or more other components.

The voice call request processor module 422 may process the request for a voice call session from one or more user devices such as the user devices 114 of FIG. 1. One functionality of the voice call request processor module 422 is to verify the device identification of requesting one or more user devices that may be used in purchasing goods or services, sending or receiving of payments, and/or the like. During an initial sign-in to the data exchange application, a subscriber may enter the subscriber's name and personal information, device identification of the user device, user profiles, and/or other information such as types and modes of payments preferred by the subscriber e.g., Zelle™, PayPal™, etc. In this regard, the voice call request processor module 422 may search for matching device identification in the data storage 430 to verify the authenticity of the requesting user device. Upon verification of the authenticity of the requesting user device, the corresponding stored information associated with the requesting user device may be retrieved and utilized for data exchanges during the voice call session. Another functionality of the voice call request processor module 422 is to queue the received requests for voice call sessions. For example, the queueing is based according to the time that they were received.

The communication manager module 424 may be configured to manage the voice call sessions between user devices. One functionality of the communication manager module 424 is to associate different USNs for different voice call sessions between user devices. The USN's may be retrieved from the USN module 426. In one example, the communication manager module 424 associates a particular USN upon an acceptance of the request for voice call session by the recipient user device. The particular USN may be used during toggling between voice call sessions. In this case, the interface menu may display the USN of the active voice call session and the USNs of voice call sessions that are on-hold or in standby mode. The particular USN can also be used as an identifier or label to the storage locations of one or more activities between the transacting parties during the corresponding voice call session. The one or more activities may include payments of goods or services, electronic signatures, sending of additional conditions, and/or other data exchanges between the calling and recipient user devices during the duration of the voice call session.

In another example, the communication manager module 424 may trigger the running of a timer upon sending the request to the recipient user device. Upon expiration of a time period threshold, and without an acceptance of the request by the recipient user device, the communication manager module 424 may connect the calling user device to a voicemail inbox (or register) of the recipient user device. The communication manager module 424 may then associate a USN to the established voice call session even though the calling user device is directed to the voicemail register of the recipient user device. In these examples, the communication manager module 424 may prompt the user devices to display an interface menu that enables the corresponding users of the calling and called user devices to request and/or perform data exchanges. The interface menu may show the parties to the voice call sessions, the USNs, and the preferred type and mode of payments by the parties. The interface menu can further show real-time transactions between the user devices. The real-time transactions may include ongoing negotiations between the parties while communicatively connected. The real-time transactions may include documentation of the transactions between the parties during the voice call session for evidentiary purposes.

In one embodiment, the interface menu may allow the users to toggle between USNs and, thus, the users can be directed to corresponding financial payments and other information associated with the toggled USN. For example, subscriber information entered during subscription sign-up for the calling user device may include details of preferred financial payments, conditions of payment, and other options for payment of transactions. In this example, the communication manager module 424 associates the subscriber information to the assigned USN such that the other transacting parties can conveniently access the information of the calling user device via the interface menu.

Given an instance where an answering chatbot is communicating with the calling user device, the interface menu may enable the calling user device to complete the payment and/or other transactions between the parties. For example, the communication manager module 424 may receive a request for a data transfer through the interface menu. In this case, the communication manager module 424 may facilitate the data transfer between the calling user device and the recipient user device. The communication manager module 424 may utilize a particular communication platform in the data transfer that can be different from the communication platform used in the voice call session. The answering chatbot may include a program that simulates and processes conversation from the calling user device, allowing the user of the calling user device to interact with the called user device as if they were communicating with a real person.

Another functionality of the communication manager module 424 is to distinguish transactions between user devices in each voice call session. For example, the communication manager module 424 may assign different tags or sub-identifiers to different transactions even though the transactions are between the same contracting parties. In this example, the contracting parties may use the interface menu to identify the different transactions that may be assigned with the different tags or sub-identifiers even though the transactions are between the same contracting parties.

In one example, the communication manager module 424 may send a notification to the user devices of the status of the transaction. For example, the communication manager module 424 may send a notice of completion of the transaction and other activities during the voice call session. In another example, the communication manager module 424 may send a notice of pending transaction when the calling user device is directed to the voicemail register of the called user device, and the called user device is not preconfigured to automatically accept offers from the calling user device. However, in the case of a chatbot, the communication manager module 424 may send a notice of pending transaction or completion of the transaction to the user devices associated with the contracting parties.

The USN module 426 may store the ID numbers that can be assigned or have been assigned to each of the voice call sessions. In one example, the ID numbers may be used as identifiers for storage locations of collected activities of the user devices during the voice call sessions. The activities may include sending of documents, electronic signing of documents, and/or the like. The voice session activity module 428 may store the collected activities of the parties during the voice call sessions. The data storage 430 may store device identifications, user profiles, and/or transaction history between the user devices. In an example, the data storage 430 may store information such as preferred payments, names of banking institutions, mode of payment, and type of payments preferred by the subscribers.

Example User Device

Figure 5:
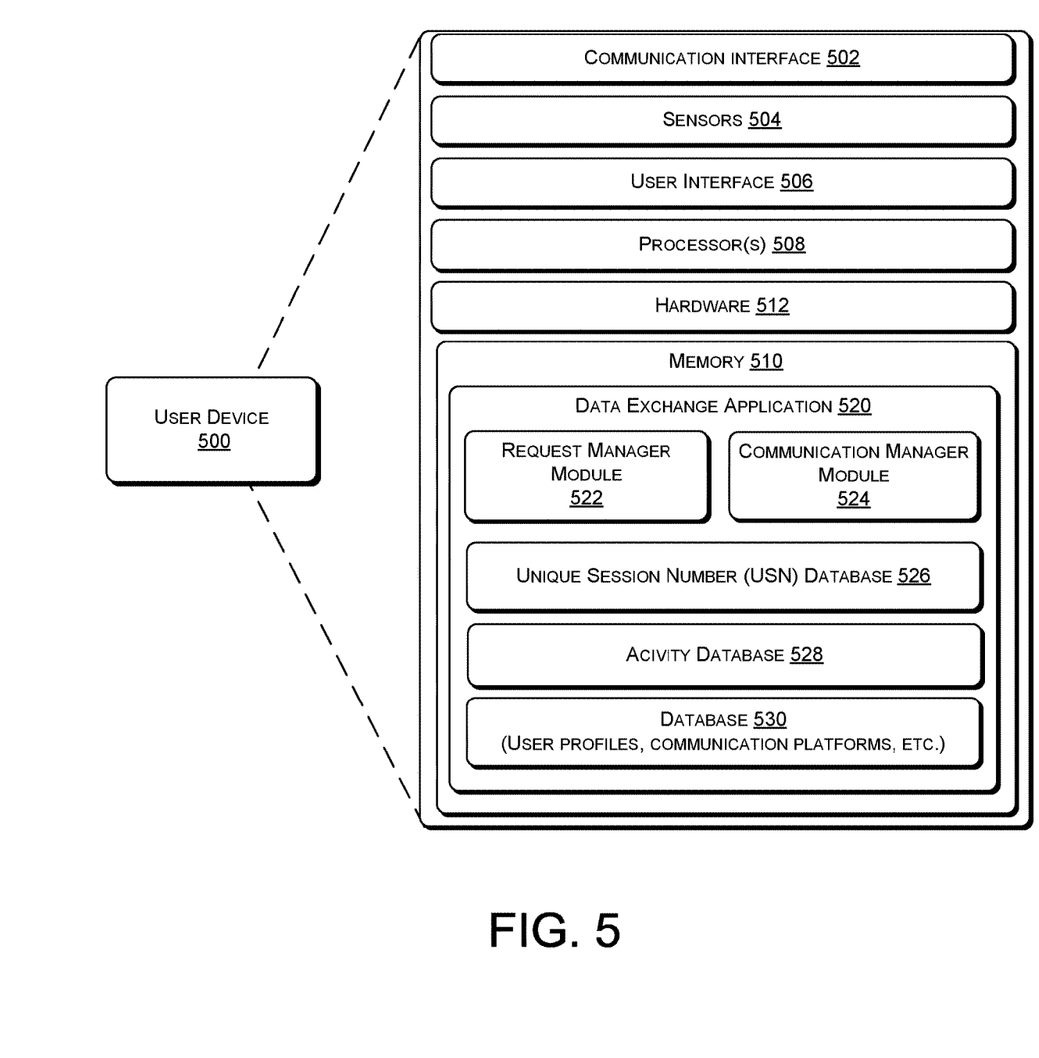
FIG. 5 is an example block diagram of a user device that includes a data exchange application to implement the data exchanges during the voice call sessions.

FIG. 5 is a block diagram showing various components of a user device 500 that includes a data exchange application to implement the data exchange while in a voice call session. In one example, the user device 500 may act as a subscriber or client device that relies on the network server to perform the data exchange during the voice call. In this example, functionalities of the user device 500 may include accepting the request for a voice call session, displaying the interface menu, and using the interface menu to toggle between voice call sessions or perform data exchange. In another example, the user device 500 may perform a scaled version of implementing the data exchange during the voice call session as described in the network server 400 of FIG. 4. The scaled version may be limited by the processing capability of the user device. In this regard, the user device 500 may use the resources of the network server 400 and implement the data exchange over a larger number of user devices.

The user device 500 may include a communication interface 502, one or more sensors 504, a user interface 506, one or more processors 508, memory 510, and device hardware 512. The communication interface 502 may include wireless and/or wired communication components that enable the user device to transmit or receive voice or data communication via the wireless carrier network, as well as other telecommunication and/or data communication networks. The sensors 504 may include a signal strength sensor, cameras, and/or a global positioning system (GPS) sensor, among other appropriate sensors. The signal strength sensor may detect signal power in a cellular communication interface and/or a direct communication interface. The cameras may capture images of the environment while the GPS sensor may detect orientation, movement, and geolocation of the user device 500.

The user interface 506 may enable a subscriber to enter inputs and read outputs. The user interface 506 may include a data output device (e.g., visual display, audio speakers), and one or more data input devices. The data input devices may include but are not limited to, combinations of one or more keypads, keyboards, mouse devices, touch screens, microphones, speech recognition packages, and any other suitable devices or other electronic/software selection methods. As a client device, the user interface 506 may display on the user interface 506 the interface menu that enables the user to request data exchanges during the voice call sessions or toggle between voice call sessions. The interface menu may display different USNs for different voice call sessions and the user may toggle between voice call sessions via the selection of the corresponding USN. The interface menu may also be used to identify participating user devices in a particular voice call session to which the user device 500 can be a participant.

The memory 510 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 512 may include a modem that enables the user device 500 to perform data communication with the wireless carrier network. The device hardware 512 may further include signal converters (e.g., a digital-to-analog converter, an analog-to-digital converter), antennas, hardware decoders, and encoders, graphics processors, a universal integrated circuit card (UICC) or an embedded UICC (eUICC), and/or the like, that enable the user device 500 to execute applications and provide data communication functions.

The one or more processors 508 and the memory 510 may implement an operating system 514, device software 516, and a data exchange application 520. Such software may include routines, program instructions, objects, and/or data structures that are executed by the processors 508 to perform particular tasks or implement particular abstract data types. One or more processors 508 in conjunction with the data exchange application 520 may further operate and utilize a request manager module 522, communication manager module 524, USN database 526, activity database 528, and database 530. The functions and operations of the operating system 514 and the device software 516 correspond to the functions and operations of the operating system 410 and device software 412 as described above for network server 400.

The data exchange application 520, when executed, manages the data exchanges with other user devices during the voice call sessions as described herein. The data exchange application 520, which corresponds to the data exchange platform 420 of FIG. 4, may be a single block of executable instructions or it may be made up of several components. The components included in at least one implementation are described below. However, it is noted that in other implementations, more or fewer components may be configured and that one or more operations attributed to a particular component in the following description may be implemented in one or more other components.

When the user device 500 is managing the data exchange, the request manager module 522 may receive and process one or more requests for voice call sessions from other user devices. In one example, the request manager module 522 may verify the source of the request for voice call sessions. For example, the request manager module 522 may parse a particular received request to verify whether the device identification is associated with the subscription information that the requestor device provided during the initial sign-up. In this example, the request manager module 522 may access the user profile or subscriber information of the calling user device from the database 530. Alternatively, the request manager module 522 may access the data storage 430 of the network server 400 of FIG. 4 to perform this verification.

Following the verification of the request above, the communication manager module 524 may be configured to facilitate a visual alert, an audio alert, or a vibrating alert in the recipient user device (not shown). Upon acceptance of the call by the recipient user device, the communication manager module 524 may assign a USN to the voice call session and prompt a display of the interface menu on the user interfaces of the user devices associated with transacting parties. In one embodiment, the interface menu includes a dialogue box that the user can utilize to request or accept requests for data exchanges, enter into a written contract, pay consideration of the entered contract, and/or the like.

The activity database 528 may store the collected activities for each of the voice call sessions as described above. For example, the collected activities may include one or more transactions such as purchasing of goods or services during the voice call session. The database 530 in conjunction with the activity database 528 may store device identifications, user profiles, and/or transaction history between the user devices.

Example Implementation of an Interface Menu

Figure 6:
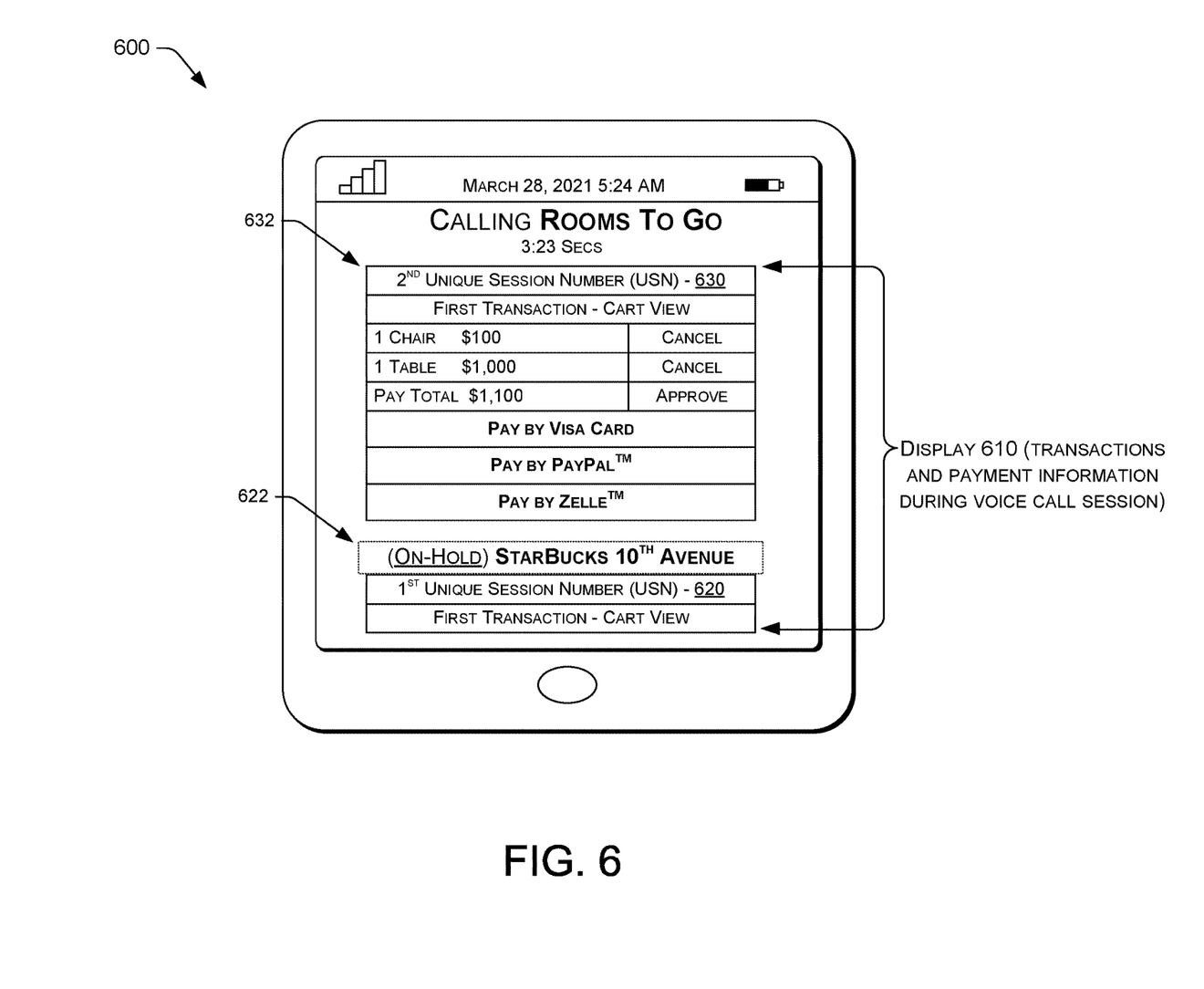
FIG. 6 is an example interface menu that enables a user to perform data exchanges during voice call sessions.

FIG. 6 illustrates an example interface menu 600 that is displayed on the user device during the voice call session. In one example, the interface menu 600 may enable a user to request data exchanges without interrupting the voice conversations between the parties. The interface menu 600 may include a display 610 that shows substantively real-time transactions between the parties during the voice call session. The display 610 further shows a first USN 620 that is assigned to a first voice call session 622, and a second USN 630 that is assigned to a second voice call session 632. In one example, the user may place the first voice call session 622 on hold (standby status) and perform data exchange for the second voice call session 632 (active status). In another example, the user may toggle or reinstate the first voice call session 622 to be in an active voice call session and place the second voice call session 632 on hold. In these examples, the payment information and other user information details may follow the toggled voice call session to avoid payment errors between transacting parties.

In one example, the financial information, such as types and mode of payment preferred by each user device in the first voice call session 622 and the second voice call session 632, may be collected and stored during initial subscription sign-up by respective users associated with the user devices.

In this example, the network server may retrieve the financial information from the database and associate the retrieved financial information to corresponding voice call sessions. In this regard, when the user toggles between the first voice call session 622 and the second voice call session 632, the user can perform data exchanges without manually inputting, for example, the financial information of the calling user device and the called user device. For example, for the second USN 630, the calling user device may pay the consideration of the contract via the visa card, PayPal™, and/or so on. In this example, the preferred type and mode of payments may be shown in the interface menu 600.

Example Process

Figure 7:
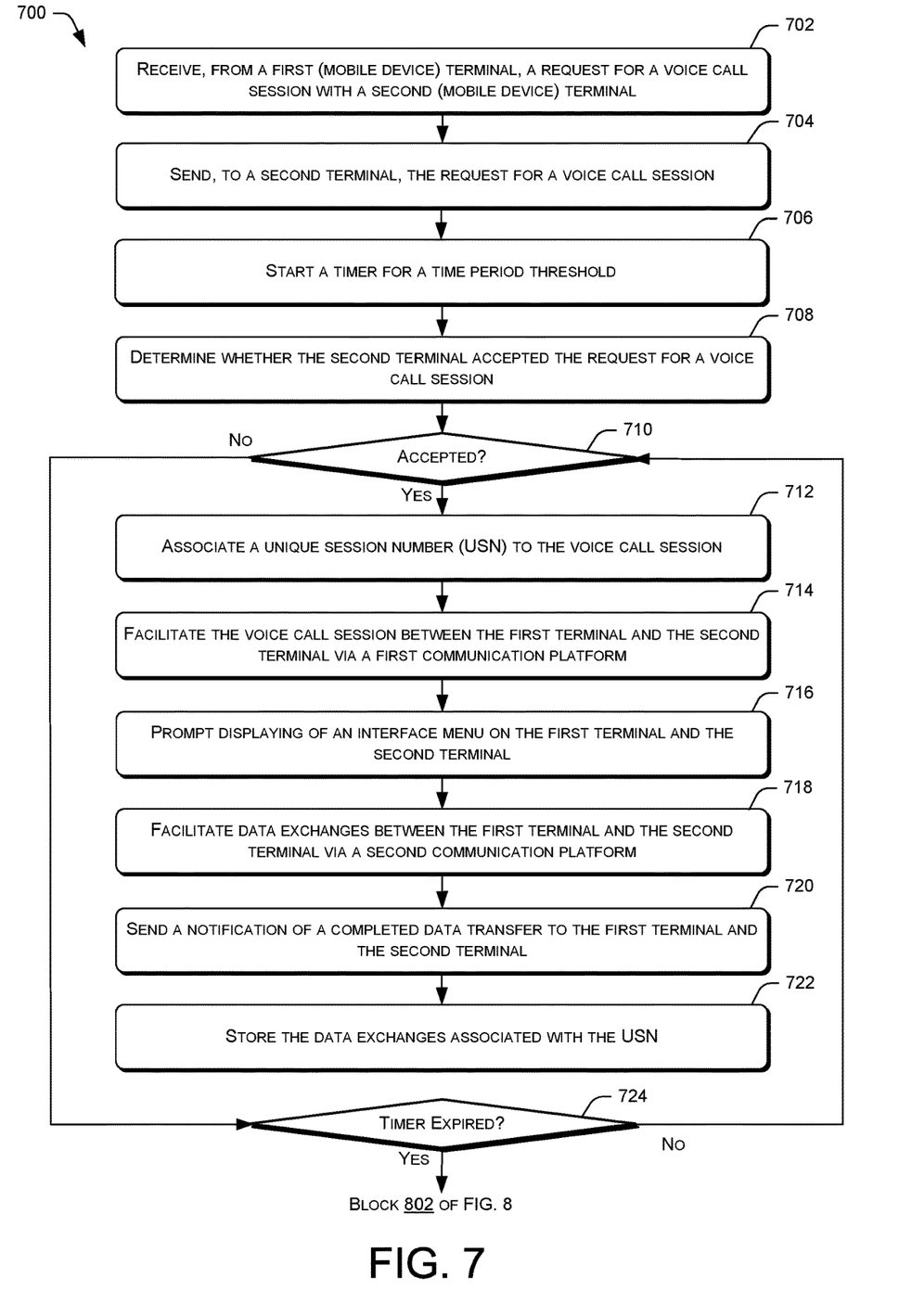
FIGS. 7-8 are flow diagrams of example methodological implementations for implementing the data exchanges during the voice call sessions via a network server.
Figure 8:
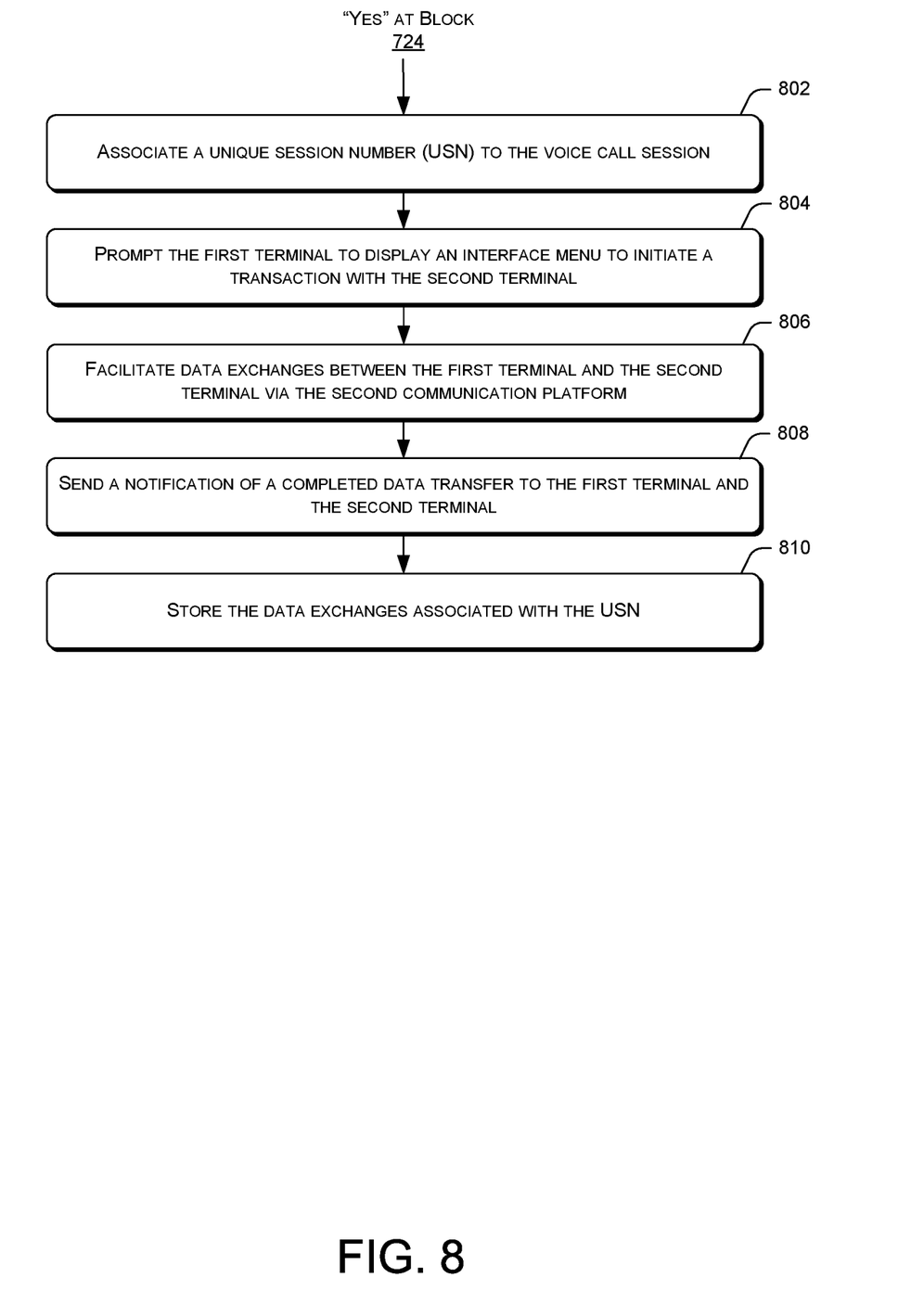

FIGS. 7-8 present illustrative processes 700-800 for performing data exchanges during the voice call sessions. The processes 700-800 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 700-800 are described with reference to FIGS. 1-6.

FIG. 7 is a flow diagram of an example process 700 for performing data exchanges during the voice call sessions as described herein. At block 702, the network server 400 may receive from a first mobile device terminal a request for a voice call session with a second mobile device terminal. For example, the first and second mobile device terminals may represent the calling user device and the called user device, respectively.

At block 704, the network server 400 sends the request to the second mobile device terminal. Further, the network server 400 starts a timer for a time period threshold (at block 706) following the sending of the request to the second mobile device terminal. The timer may include a clock that is triggered by the sending of the request to the second mobile device terminal. At block 708, the network server 400 determines whether the second mobile device terminal accepted the request. If the second mobile device terminal accepted the request ("Yes" at block 710), then, at block 712, the network server 400 may assign or associate a USN to the voice call session.

At block 714, the network server 400 may facilitate a voice call session between the first and second mobile device terminals via a first communication platform. For example, the first communication platform may utilize cellular communication that uses cellular data or VoIP. In this example, the voice call session may include a communicative connection between the first and second mobile device terminals.

At block 716, the network server 400 may prompt displaying of an interface menu on user interfaces of the first and second mobile device terminals to enable the corresponding users to perform data exchanges during the voice call session that is associated with the USN. For example, the interface menu 600 of FIG. 6 is displayed on the user interfaces of each of the user devices under the assigned USN. In this example, the interface menu 600 may allow the corresponding users to toggle between the voice call sessions and perform the data exchanges.

At block 718, the network server 400 may facilitate data exchanges between the first and second mobile device terminals via a second communication platform. In one example, the network server 400 may group the user devices in different voice call sessions. The network server 400 may retrieve payment information of each of the grouped user devices and associate the retrieved payment information to the corresponding voice call sessions. In this example, the network server 400 may facilitate secure data exchanges in the voice call sessions without the user sending manually or verbally the financial information over the voice call session. The data exchanges may utilize the second communication platform such as an email platform, exchange platform, text messaging platform, or a social network platform. In one embodiment, the first and second communication platforms may use cellular communication data. For example, data and voice channels may be operated at the same time to provide simultaneous transmission of data and digitally encoded voice signals. At block 720, the network server 400 may send a notification of a completed data transfer to the first mobile device terminal and the second mobile device terminal. The network server 400 may then store the data exchanges associated with the USN (Block 722).

Returning to decision block 710, if the second mobile device did not or has yet to accept the request ("No" at block 710), then, at decision block 724, the network server 400 may determine whether the time period threshold has expired. If the time period threshold has expired ("Yes" at block 724), then, the process continues at block 802 of FIG. 8. If the time period threshold has yet to expire ("No" at block 724), then, the process goes back to the decision block 710 where the network server determines whether the called party has accepted the request for the voice call session.

FIG. 8 is a continuation flow diagram of the example process 700 of FIG. 7. In particular, FIG. 8 illustrates the data exchange when the time period threshold for accepting the request for a voice call session has expired. At block 802, in response to the determination that the time period threshold has expired ("Yes" at block 724 of FIG. 7), then the network server 400 may associate a USN to the voice call session. In one example, the network server 400 may associate the USN even though the calling user device is directed to the voicemail register of the called user device.

At block 804, the network server 400 may prompt the first mobile device terminal to display the interface menu to enable the user to initiate a transaction with the second mobile device terminal. At block 806, the network server 400 may facilitate data exchanges between the first mobile device and the second mobile device via the second communication platform. At block 808, the network server 400 may send a notification of a completed data transfer to the first terminal. At block 810, the network server may store the data exchanges associated with the USN.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more non-transitory computer-readable storage media storing computer-executable instructions that upon execution cause one or more computers to collectively perform acts comprising:
    receiving, from a first mobile device terminal, a request for a voice call session with a second mobile device terminal;
    facilitating a first voice call session between the first mobile device terminal and the second mobile device terminal via a first communication platform, wherein a first unique session number (USN) is associated with the first voice call session;
    receiving, from a third mobile device terminal, a request for a voice call session with the second mobile device terminal;
    sending, to the second mobile device terminal, the request for a voice call session from the third mobile device terminal;
    determining whether the second mobile device terminal accepted the request for a voice call session from the third mobile device terminal;
    in response to an accepted request, associating a second USN to the voice call session between the second mobile device terminal and the third mobile device terminal;
    placing on hold the first voice call session between the first mobile device terminal and the second mobile device terminal over the first communication platform;
    facilitating a second voice call session between the second mobile device terminal and the third mobile device terminal via the first communication platform;
    prompting a display of an interface menu on the third mobile device terminal and the second mobile device terminal to enable corresponding users to request data exchanges during the second voice call session that is associated with the second USN;
    facilitating the data exchanges between the second mobile device terminal and the third mobile device terminal via a second communication platform; and
    storing the data exchanges during the second voice call session that is associated with the second USN.

2. The one or more non-transitory computer-readable storage media of claim 1, the acts further comprising:
    storing the data exchanges during the first voice call session that is associated with the first USN.

3. The one or more non-transitory computer-readable storage media of claim 1, the acts further comprising:
    sending a notification of a completed data transfer to the third mobile device terminal;
    receiving a request from the third mobile device terminal to terminate the second voice call session;
    terminating the second voice call session between the second mobile device terminal and the third mobile device terminal; and
    reinstating the first voice call session between the first mobile device terminal and the second mobile device terminal.

4. The one or more non-transitory computer-readable storage media of claim 1, the acts further comprising:
    starting a timer for a time period threshold upon the sending to the second mobile device terminal of the request for voice call session from the first mobile device terminal;
    in response to an expiration of the time period threshold and without an acceptance of the request for voice call session from the second mobile device terminal, connecting the first mobile device terminal to a voice call register of the second mobile device terminal;
associating the first USN to a connection between the first mobile device terminal and the second mobile device terminal;
prompting the first mobile device terminal to display the interface menu that enables the first mobile device terminal to initiate data exchanges with the second mobile device terminal; and
storing the data exchanges associated with the first USN.

5. The one or more non-transitory computer-readable storage media of claim 1, the acts further comprising:
retrieving payment information associated with the first mobile device terminal and the second mobile device terminal;
associating a retrieved payment information with the first USN;
using the retrieved payment information for the data exchanges during the first voice call session.

6. The one or more non-transitory computer-readable storage media of claim 1, wherein the first communication platform includes a Voice over Internet Protocol (VoIP) or a cellular communication.

7. The one or more non-transitory computer-readable storage media of claim 1, wherein the second communication platform includes a text messaging platform, a social network platform, an exchange platform, or an email platform.

8. The one or more non-transitory computer-readable storage media of claim 1, wherein the first USN includes an identification (ID) number that is used as an identifier of storage locations for storing at least one activity between the first mobile device terminal and the second mobile device terminal during the first voice call session.

9. The one or more non-transitory computer-readable storage media of claim 1, wherein the data exchanges include payment of goods or services, adding conditions to a contract, and performing electronic signatures during the voice call session.

10. A network server, comprising:
one or more processors; and
memory including a plurality of computer-executable components that are executable by the one or more processors to perform a plurality of actions, the plurality of actions comprising:
receiving, from a first mobile device terminal, a request for a voice call session with a second mobile device terminal;
facilitating a first voice call session between the first mobile device terminal and the second mobile device terminal via a first communication platform, wherein a first unique session number (USN) is associated with the first voice call session;
receiving, from a third mobile device terminal, a request for a voice call session with the second mobile device terminal;
sending, to the second mobile device terminal, the request for a voice call session from the third mobile device terminal;
determining whether the second mobile device terminal accepted the request for a voice call session from the third mobile device terminal;
in response to an accepted request, associating a second USN to the voice call session between the second mobile device terminal and the third mobile device terminal;
placing on hold the first voice call session between the first mobile device terminal and the second mobile device terminal over the first communication platform;
facilitating a second voice call session between the second mobile device terminal and the third mobile device terminal via the first communication platform;
prompting a display of an interface menu on the third mobile device terminal and the second mobile device terminal to enable corresponding users to request data exchanges during the second voice call session that is associated with the second USN;
facilitating the data exchanges between the second mobile device terminal and the third mobile device terminal via a second communication platform; and
storing the data exchanges during the second voice call session that is associated with the second USN.

11. The network server of claim 10, the plurality of actions further comprising:
storing the data exchanges during the first voice call session that is associated with the first USN.

12. The network server of claim 10, the plurality of actions further comprising:
sending a notification of a completed data transfer to the third mobile device terminal;
receiving a request from the third mobile device terminal to terminate the second voice call session;
terminating the second voice call session between the second mobile device terminal and the third mobile device terminal; and
reinstating the first voice call session between the first mobile device terminal and the second mobile device terminal.

13. The network server of claim 10, the plurality of actions further comprising:
starting a timer for a time period threshold upon the sending to the second mobile device terminal of the request for voice call session;
in response to an expiration of the time period threshold and without an acceptance of the request for voice call session from the second mobile device terminal, connecting the first mobile device terminal to a voice call register of the second mobile device;
associating the first USN to a connection between the first mobile device terminal and the second mobile device terminal;
prompting the first mobile device terminal to display the interface menu that enables the first mobile device terminal to initiate data exchanges with the second mobile device terminal; and
storing the data exchanges associated with the first USN.

14. The network server of claim 10, the plurality of actions further comprising:
retrieving payment information associated with the first mobile device terminal and the second mobile device terminal;
associating a retrieved payment information with the first USN;
using the retrieved payment information for the data exchanges during the first voice call session that is associated with the first USN.

15. The network server of claim 10, wherein the first communication platform includes a Voice over Internet Protocol (VoIP) or a cellular communication.

16. The network server of claim 10, wherein the second communication platform includes a text messaging platform, a social network platform, an exchange platform, or an email platform.

17. The network server of claim 10, wherein the first USN includes an identification (ID) number that is used as an identifier of storage locations for storing at least one activity between the first mobile device terminal and the second mobile device terminal during the first voice call session.

18. A computer-implemented method, comprising:
- receiving, from a first mobile device terminal, a request for a voice call session with a second mobile device terminal;
- sending, to a second mobile device terminal, the request for a voice call session;
- facilitating a first voice call session between the first mobile device terminal and the second mobile device terminal via a first communication platform, wherein a first unique session number (USN) is associated with the first voice call session;
- receiving, from a third mobile device terminal, a request for a voice call session with the second mobile device terminal;
- sending, to the second mobile device terminal, the request for a voice call session from the third mobile device terminal;
- determining whether the second mobile device terminal accepted the request for a voice call session from the third mobile device terminal;
- in response to an accepted request, associating a second USN to the voice call session between the second mobile device terminal and the third mobile device terminal;
- placing on hold the first voice call session between the first mobile device terminal and the second mobile device terminal over the first communication platform;
- facilitating a second voice call session between the second mobile device terminal and the third mobile device terminal via the first communication platform;
- prompting a display of an interface menu on the third mobile device terminal and the second mobile device terminal to enable corresponding users to request data exchanges during the second voice call session that is associated with the second USN;
- facilitating the data exchanges between the second mobile device terminal and the third mobile device terminal via a second communication platform; and
- storing the data exchanges during the second voice call session that is associated with the second USN.

19. The computer-implemented method of claim 18 further comprising:
- storing the data exchanges during the first voice call session that is associated with the first USN.

20. The computer-implemented method of claim 18, wherein the first USN includes an identification (ID) number that is used as an identifier of storage locations for storing at least one activity between the first mobile device terminal and the second mobile device terminal during the first voice call session.

* * * * *